(12) United States Patent
Klimenko et al.

(10) Patent No.: US 9,366,523 B2
(45) Date of Patent: Jun. 14, 2016

(54) ROTATION ANGLE SENSOR (71) Applicant: Bourns, Inc., Riverside, CA (US)

(72) Inventors: Valeri Klimenko, München (DE); Johann Jahrstorfer, München (DE)

(73) Assignee: BOURNS, INC., Riverside, CA (US)

( * ) Notice: Subject to any disclaimer, the term of this patent is extended or adjusted under 35 U.S.C. 154(b) by 72 days.

(21) Appl. No.: 14/359,246

(22) PCT Filed: Nov. 10, 2012

(86) PCT No.: PCT/EP2012/004685
§ 371 (c)(1),
(2) Date: May 19, 2014

(87) PCT Pub. No.: WO2013/075796
PCT Pub. Date: May 30, 2013

(65) Prior Publication Data
US 2014/0320120 A1    Oct. 30, 2014

(30) Foreign Application Priority Data
Nov. 21, 2011  (DE) .......................... 10 2011 118 928

(51) Int. Cl.
*G01B 7/30* (2006.01)
*G01D 5/14* (2006.01)
*F24J 2/04* (2006.01)
*F24J 2/20* (2006.01)

(52) U.S. Cl.
CPC ................ *G01B 7/30* (2013.01); *F24J 2/0455* (2013.01); *F24J 2/202* (2013.01); *F24J 2/204* (2013.01); *G01D 5/145* (2013.01); *Y02B 10/20* (2013.01); *Y02E 10/44* (2013.01)

(58) Field of Classification Search
CPC ....................................................... G01D 5/145
USPC ..................................................... 324/207.25
See application file for complete search history.

(56) References Cited

U.S. PATENT DOCUMENTS 6,170,162 B1 * 1/2001 Jacobsen et al. .............. 33/1 PT
6,826,839 B2 * 12/2004 Lahr ............................. 33/1 PT

FOREIGN PATENT DOCUMENTS

| DE | 2341358 C2 | 2/1975 |
|---|---|---|
| DE | 89 12 785 U1 | 12/1989 |
| DE | 90 13 001 U1 | 11/1990 |

(Continued)

OTHER PUBLICATIONS

International Search Report received in International Patent Application No. PCT/EP2012/004685, mailed Mar. 13, 2013 (2 pages).

*Primary Examiner* — Reena Aurora
(74) *Attorney, Agent, or Firm* — Michael Best & Friedrich LLP (57) ABSTRACT

The rotational angle sensor for measuring the rotational angle of a shaft has two code disks, the first code disk of which is rotationally fixed to the shaft while the second code disk is held between the shaft and the housing by two spring groups. Each code disk is assigned to a sensor. The sensor of the first code disk generates a periodic rotational angle signal while the sensor which is assigned to the second code disk generates a coarse signal (U2) which is different from the first signal and which can be used to ascertain which rotation of n possible rotations the shaft is in, wherein n>1.

18 Claims, 5 Drawing Sheets

(56) References Cited

FOREIGN PATENT DOCUMENTS

| | | |
|---|---|---|
| DE | 40 28 246 A1 | 3/1992 |
| DE | 41 25 884 A1 | 2/1993 |
| DE | 42 33 393 A1 | 4/1994 |
| DE | 195 06 938 A1 | 8/1996 |
| DE | 195 39 134 C2 | 4/1997 |
| DE | 198 35 886 A1 | 2/1999 |
| DE | 198 05 106 C1 | 3/1999 |
| DE | 197 47 753 C1 | 5/1999 |
| DE | 199 00 330 A1 | 7/1999 |
| DE | 198 49 554 C1 | 3/2000 |
| DE | 199 62 241 A1 | 7/2001 |
| DE | 100 48 911 C1 | 4/2002 |
| DE | 199 37 120 C2 | 5/2003 |
| DE | 10 2005 007 259 B4 | 4/2007 |
| EP | 1 541 983 A1 | 6/2005 |

* cited by examiner

ROTATION ANGLE SENSOR

BACKGROUND

The invention relates to a rotational angle sensor, and in particular to a rotational angle sensor for detecting the rotational position of a steering shaft of a motor vehicle, which can carry out several rotations.

DE 10 2005 007 259 B4 describes a position measuring device having a rotatable shaft and a magnetic ring coupled with the shaft by way of several springs, and a magnetic yoke arranged on the outer circumference of the magnetic ring. The magnetic ring can have north and south poles alternately distributed in a circumferential direction. Upon rotation of the shaft, the movement of the magnetic ring initially lags behind that of the shaft due to the magnetic forces until the rotational forces exerted by the springs are greater than the magnetic forces, whereupon the magnetic ring is abruptly moved, releasing kinetic energy, which generates electrical impulses by way of a coil arranged on the magnetic yoke, which are counted in an evaluation device and are stored in a non-volatile memory. Thus, the counted electrical impulses are a measure for the angle of rotation of the magnetic ring. Due to the non-volatile memory, the most recently stored value can be retrieved even in the event of failure of the supply voltage. However, if the magnetic ring rotated during the failure of the supply voltage, the stored value of the rotational position no longer corresponds with the actual value, and all subsequent measurement results are incorrect.

From DE 199 62 241 A1 and DE 195 06 938 A1, rotational angle sensors are known, in which two measuring gear wheels are coupled with a gear wheel of the shaft, wherein the two measuring gear wheels have differing numbers of teeth, specifically such that in the predefined measuring range, one of the measuring gear wheels carries out a number n of full rotations, whereas the second measuring gear wheel runs through a different number of n−1 or n+1 of full rotations. Two sensors scan the rotational position of the two measuring gear wheels and generate corresponding output signals, from the phase difference of which an absolute position signal can be determined.

With these rotational angle sensors, the accuracy of the measurement depends, among other things, on the precision of the toothing. Due to manufacturing tolerances, installation tolerances with respect to the axle distances, and wear and tear, gear wheels can have a clearance, which in a more general sense can also be called a slip, and which leads to measurement errors. In the event of a reversal of the direction of rotation, this error manifests itself as hysteresis error. A further error source with gear wheels and gear rods is the lack of uniformity in the form of the teeth and the tooth spaces, and also in non-uniformity in the distribution of the teeth, which leads to linearity errors even if the engagement of the teeth is free of play. This also holds true for non-circular gear wheels, with the result that in certain rotational position ranges, a clearance is present, and in other rotational position ranges there is not. It is thereby to be taken into account that in most measuring applications plastic gear wheels are used.

To solve this problem, DE 199 62 241 A1 proposes to tension the measuring gear wheels in a spring-loaded manner against the gear wheel of the shaft.

DE 199 37 120 C2 describes a steering angle measuring device having a buffer spring that is spirally arranged around the steering column of a vehicle, one end thereof being arranged on the steering column and the other end thereof being stationary, wherein on the buffer spring, a measuring element for measuring the strain and/or bending of the buffer spring is arranged. From the measured strain and/or bending of the buffer spring, the steering angle is determined.

DE 198 35 886 A1 describes a steering angle sensor having a buffer spring, which is likewise fastened to the steering shaft and to the housing. A sensor detects the change in the inductance of the buffer spring, which is caused by a change in the number of windings. The buffer spring is a flexible flat strip of resilient material, which frequently is also referred to as clock spring.

DE 42 33 393 A1 proposes to provide a spring membrane, which is fastened to a housing and to a travelling nut that is slidable alongside the shaft. Strain gauges detect the deformation of the spring membrane.

DE 198 05 106 C1 shows a rotational position sensor having a rotatable shaft and a fixed stator surrounding the same. In the gap between the shaft and the stator, two series connected buffer springs having opposite winding directions are arranged, in the connecting region of which a covered electrode is arranged, which in interaction with a fixed electrode on the stator forms a capacitor. When the shaft rotates, the two electrodes change their relative position to one another and cause a change in capacitance of the capacitor, which is a measure for the rotation of the shaft relative to the stator.

Modern motor vehicle electronics need a highly precise angle of rotation signal for the rotational angle of the steering shaft. That is to say, good linearity, absence of hysteresis, high resolution capacity, and high measuring speed are required. Resistance to wear and tear, and long service life are likewise inherent criteria, as are low unit costs.

In order to meet these criteria, the sensors having measuring gear wheels as described above are very laborious and expensive. The sensors working with springs as described above do not deliver the required measuring accuracy, and in particular, not the required resolution capacity.

SUMMARY

It is therefore the object of the invention to improve the rotational angle sensor of the above-mentioned type such that it satisfies the above-listed criteria, and in particular, delivers a high-precision output signal having good resolution.

This objective is met by the features specified in patent claim 18. Advantageous embodiments and developments of the invention are to be found in the dependent claims.

The invention is based on the idea to use two sensors, wherein the first sensor measures the displacement of the shaft directly, and the second one measures the displacement of an object, which is coupled with the shaft and with a stationary, non-rotatable body by way of two spring groups.

The first sensor scans a first code disk, which rotates exactly with the shaft, and which at n rotations delivers a periodic angle signal with the period n. This signal is very precise having high resolution, and can therefore be referred to as a "fine signal". However, it cannot be ascertained, which of the possible full rotations the shaft is in.

The second sensor scans a second code disk, which is mounted above the two spring groups, and which follows the rotations of the shaft to a lesser extent only. The second code disk rotates in the entire measuring range of n rotations at a smaller angle rate than the first code disk.

In a first exemplary embodiment, the second code disk rotates at an angle rate of less than 360° if the shaft rotates at more than 360°, and in particular, at several full rotations. The angle adjustment of the second code disk can thereby also be relatively small, and can be a few degrees or a few millimeters, for example. Thus, the area of the second code disk scanned by the assigned sensor executes a substantially linear movement. In generalized terms, the force of the two springs or spring groups, which determine the position of the object coupled therewith, is measured by the second sensor. Thus, the object does not have to be an annular code disk, but can also be some other body that is connected to the two springs and/or spring groups. Therefore, a non-magnetic sensor, for example, a strain gauge sensor, can also be used for a sensor.

In an exemplary embodiment, the second code disk is connected to the stationary housing by way of several springs on the one hand, and is connected to the shaft by way of at least one spirally wound buffer spring on the other hand. The buffer spring is configured such that it can receive the number n of full rotations of the shaft. It thereby generates a force onto the second code disk in circumferential direction, which is counter to the force of the springs arranged between the code disk and the housing. Thus, the sensor dedicated to the second code disk generates a "coarse signal" having poorer resolution, which, however, is sufficiently exact to derive therefrom, which of the possible n full rotations the shaft is in. From the combined signals, that is, the coarse signal and the fine signal, a highly precise output signal for the rotational position of the shaft in full rotary range can be detected.

In the second exemplary embodiment of the invention, the spring groups are interchanged. Thus, the second code disk is directly connected to the shaft by way of several springs, and to the housing by at least one buffer spring. The first-mentioned springs have a substantially lower strain and bending capacity than the buffer springs. Thus, the second code disk essentially follows the rotational position of the shaft, however, due to the effect of the buffer spring with regard to the rotational angle, it lags behind the shaft so that the periodicity of the output signal of the second sensor is different from the output signal of the first sensor. By way of suitable design of the two spring groups, it can be achieved, for example, that the output signal of the second sensor has a periodicity of n+1, whereas that of the first sensor has a periodicity of n. The value n is >1, and in motor vehicles, the value of n is usually between 2 and 4, wherein n does not need to be a whole number, it can also be 2.5 or 3.5, for example.

According to a further development of the invention, in both exemplary developments, two buffer springs each are arranged side by side in close proximity to one another in an axial direction of the shaft, which are arranged offset by 180° relative to one another. In this way, radial forces developing during the tensioning of the buffer springs, which otherwise would bring about a radial displacement of the second code disk with respect to the center axis of the shaft, are compensated for. It goes without saying that both buffer springs have the same configuration with respect to their spring characteristic line.

Preferably, both code disks are magnetized, and the associated sensors are magnetic sensors of conventional construction. Naturally, other types of code disks and sensors can also be used, for example, optical codes, capacitive codes, or ohmic codes with corresponding sensors.

Since the rotational angle sensor is subjected to jolts and vibrations in the motor vehicle, a further development of the invention provides that the second code disk is mounted or guided in one or several damping members. In one embodiment, such a damping member consists of a guide, which engages, with little play, around the axial end of the second code disk. With axial or radial vibrations, the code disk touches said guide, which restricts the vibration on the one hand, and also dampens same as a result of friction occurring when contact is made.

If magnetized disks are used for code disks, a further development of the invention provides a shielding disk, that is, a partition wall, which shields the magnetic fields of the two code disks against one another so that the magnetic field of one code disk does not influence the sensor of the other code disk. Preferably, the springs of one spring group are bellows-like shaped springs of steel tape material, which are thus resilient to bending in a longitudinal direction but are substantially rigid in an axial direction in order to hold the second code disk so as to be non-displaceable in the axial direction. These springs are also referred to as zig-zag springs because they have a zig-zag shaped progression. Preferably, at least three or four of such springs are used offset relative to one another in equidistant spaces.

According to a further development of the invention, both spring groups can be arranged inside the annular second code disk in order to reduce the structural size of the rotational angle sensor, wherein, depending on the exemplary embodiment, the fastening of the spring groups is selected such that either the buffer springs or the other springs, for example the zig-zag springs are connected to the shaft, whereas the other ends of both spring groups are connected to the second code disk.

Therebelow, the invention is described in more detail with the aid of exemplary embodiments in combination with the drawings, wherein:

DETAILED DESCRIPTION

Figure 1:
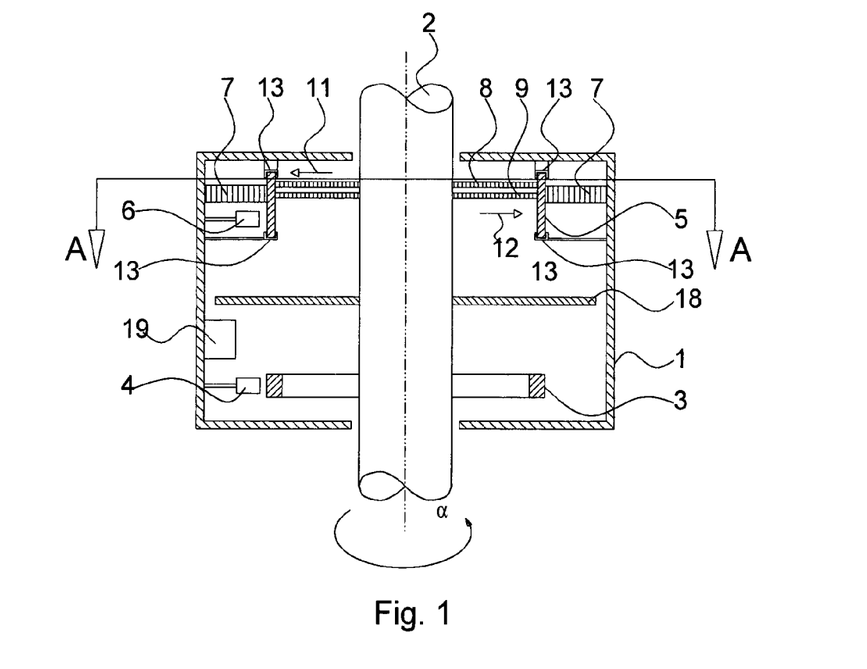
FIG. 1 shows a schematic longitudinal cross-section of the rotational angle sensor according to a first exemplary embodiment of the invention.

FIG. 1 shows a schematic cross-section of the rotational angle sensor according to the invention. The rotational angle sensor is accommodated in a stationary housing 1, through which a shaft 2 is inserted, the rotational angle α of which relative to the housing 1 is to be measured, specifically across an angular range of more than 360°, and in particular, more than two full rotations. To shaft 2, a first code disk 3 is mounted in a rotationally fixed manner. For example, the code disk 3 is a magnetized disk, the rotational position of which is scanned by a first sensor 4, wherein in this embodiment, the first sensor 4 is a magnetic sensor generating an electrical output signal U1 corresponding to the rotational angle α within a full rotation. One can recognize that it is a periodic signal with information, within a period of 360°, about the angle α only, but not which of the possible periods of the measuring range from n*360° the shaft 2 is in.

In order to determine, which full rotation, that is period, the shaft 2 is in, a second code disk 5 is provided, which can also be magnetized, and which is arranged as a ring around the shaft 2. A second sensor 6 connected to the housing 1 scans the rotational position of the second code disk 5 and generates an output signal U2.

The second code disk 5 is connected to the housing 1 by way of several springs 7 so that the second code disk 5 is spring-mounted with respect to the housing 1. The springs 7 are arranged at equidistant spaces around the second code disk 5, wherein in practice, at least three, and particularly four such springs 7 are to be provided. These springs 7 are preferably bellows-like springs, which are rigid in the axial direction of the shaft 2, and are resilient in the radial direction of the shaft 2 and in circumferential direction of the shaft 2. Thus, the second code disk 5 is essentially non-displaceable in the axial direction of the shaft 2.

Furthermore, the second code disk 5 is connected to the shaft 2 by way of two buffer springs 8 and 9. In a plane, these buffer springs 8 and 9 are spirally-wound springs, which are also referred to as "clock springs". These springs are dimensioned such that the shaft 2 can rotate around the full range of rotation of $n*360°$, with $n>1$. Depending on the rotational position of the shaft 2, these two springs 8, 9 are either tensioned or released, thus exerting a force onto the second code disk 5 in the circumferential direction, that is, the rotational direction. Depending on the dimensioning of the springs 7, 8, and 9, the second code disk 5 is rotated relative to the housing 1. However, in the full range of rotation of $n*360°$ of the shaft 2, the second code disk 5 is rotated by less than 360°. The output signal U2 of the second sensor 6, which detects the rotational position of the second code disk 5, then equals the value $\alpha$, wherein $\alpha$ can be greater than 360°.

From the signal U2, it then can be determined without a problem, which full rotation the shaft 2 is in. Thus, the signal U2 can be referred to as a coarse signal, whereas the signal U1 has a substantially higher resolution, and thus can be referred to as a fine signal. The coarse signal is not sufficiently exact for the usually required measuring accuracy of steering angle sensors for motor vehicles.

In principle, one of the two buffer springs 8 and 9 would also be sufficient, however, the problem arises that during the tensioning of the single buffer spring 8 or 9, radial forces in the direction of arrows 11 and 12 also occur, by way of which the second code disk 5 would be radially displaced from a center position. For this reason, two buffer springs 8 and 9 are positioned side by side in the closest possible proximity to one another are provided, which, rotated by 180° relative to one another, are fastened to the shaft 2 and the second code disk 5. The radial forces (arrows 11 and 12) resulting from the tensioning of buffer spring 8 and the buffer spring 9 are then of equal magnitude in opposite directions and counterbalance each other. If the two buffer springs 8 and 9 are close enough to one another, a remaining tilting moment is negligible compared to the forces of the spring 7 acting against same.

Just because of the resilient mounting of the second code disk 5, despite the bellows-like springs 7, it cannot be ruled out that during jolts or vibrations as they occur in motor vehicles, the second code disk 5 also moves in an axial and radial direction, which can falsify the measurement result of the second sensor 6. In order to prevent this, the second code disk 5 is further guided in damping members 13, which in turn are fastened to the housing 1. These damping members 13 engage around the annular second code disk 5 at the axial ends thereof with little movement. When vibrations occur, the second code disk 5 then touches said damping members 13, and by mechanical friction, is prevented from stronger movement. As soon as this contact ends, the second code disk 5 is brought back into the correct rotational position by the springs 7, 8, and 9.

It is pointed out that the two code disks 3 and 5 can be coded in ways other than magnetically. Optical markings in particular are also possible, wherein the two sensors 4 and 6 are then correspondingly optical sensors. In general, it would also be possible to coat the code disks at their outer circumference with an ohmic resistance, and to use wiper contacts for sensors 4 and 6.

Figure 2:
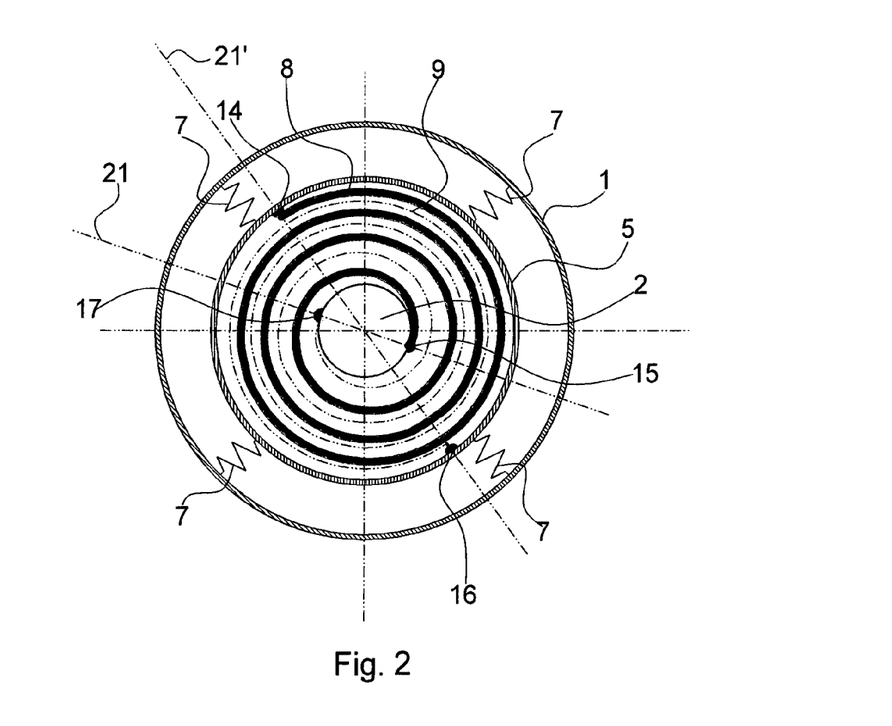
FIG. 2 shows a cross-section along the line A-A of FIG. 1.

FIG. 2 shows a cross-section along the line A-A of FIG. 1, that is, a top view of the two buffer springs 8 and 9. It can be clearly discerned that the two buffer springs 8 and 9 are rotated at an angle of 180° relative to each other. The projections of the two inner ends 15 and 17 of the buffer springs 8 and 9 are on a line 21, which goes through the center of the shaft 2. Furthermore, the projections of the two outer ends 14 and 16 of the buffer springs 8 and 9 are on a line 21', which naturally only corresponds to the illustrated line 21 with a relative rotational position between shaft 2 and code disk 5.

In FIG. 2, the respective ends 14 and 15 of the buffer spring 8 on the one hand, and the ends 16 and 17 of the buffer spring 9 on the other hand are arranged such that the shaft 2 is located therebetween. It is, of course, also possible to fix the ends of the two buffer springs 8 and 9 such that respectively, they are located on the same side of the shaft. In both cases it is achieved that radial forces counterbalance each other corresponding to the arrows 11 and 12 in FIG. 1, if the springs 8 and 9 are rotated at an angle of 180° relative to each other.

If magnetized code disks 3 and 4 are used, a separating disk 18 is arranged between the two code disks 3 and 5 in addition in order to ensure that the magnetic fields of the two code disks 3 and 5 do not mutually influence each other. This separating disk 18 is made of magnetic material and is connected to the shaft 2 in a rotationally fixed manner.

Figure 3:
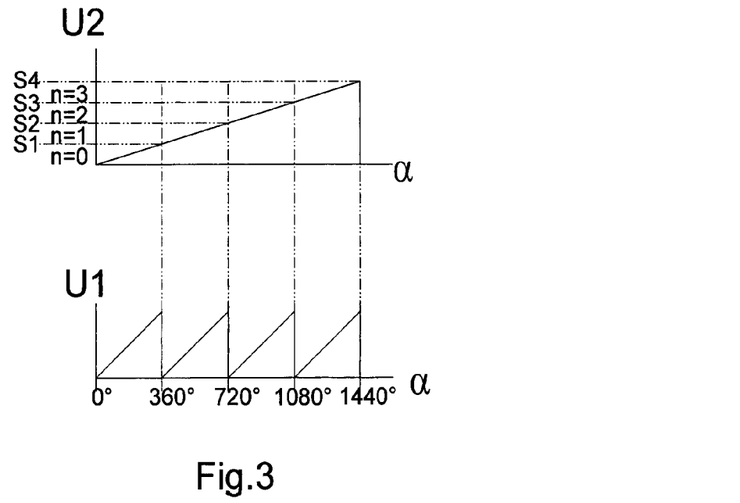
FIG. 3 shows a diagram of the output signals of both sensors of the exemplary embodiment of FIGS. 1 and 2.

FIG. 3 shows the output signals U1 and U2 of the two sensors 4 and 6 for a measuring range of four full rotations, that is, $4*360°$, that is, 1440°. An evaluation circuit 19 arranged inside or outside the housing 1 receives the two output signals U1 and U2 and detects, for example, by way of threshold values S1 to S4 monitored by comparators, a whole-number value of n, as illustrated with the representative values n1, n2, n3, and n4 in the diagram for U2. The measured angle then corresponds to the value $n*360°+U1$. In this way, a highly accurate rotational position signal for the angle $\alpha$ is obtained in a simple way.

Figure 4:
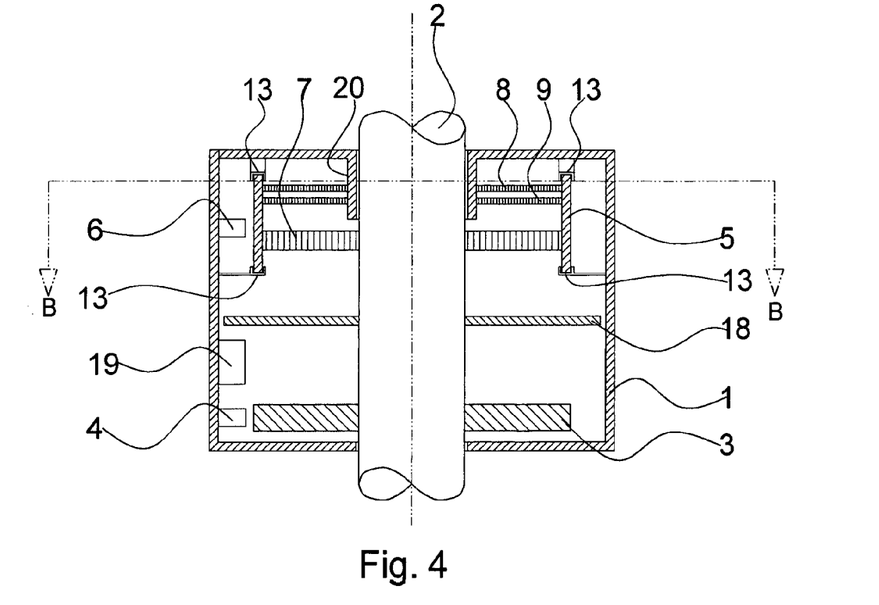
FIG. 4 shows a longitudinal cross-section of a rotational angle sensor according to a second exemplary embodiment of the invention.
Figure 5:
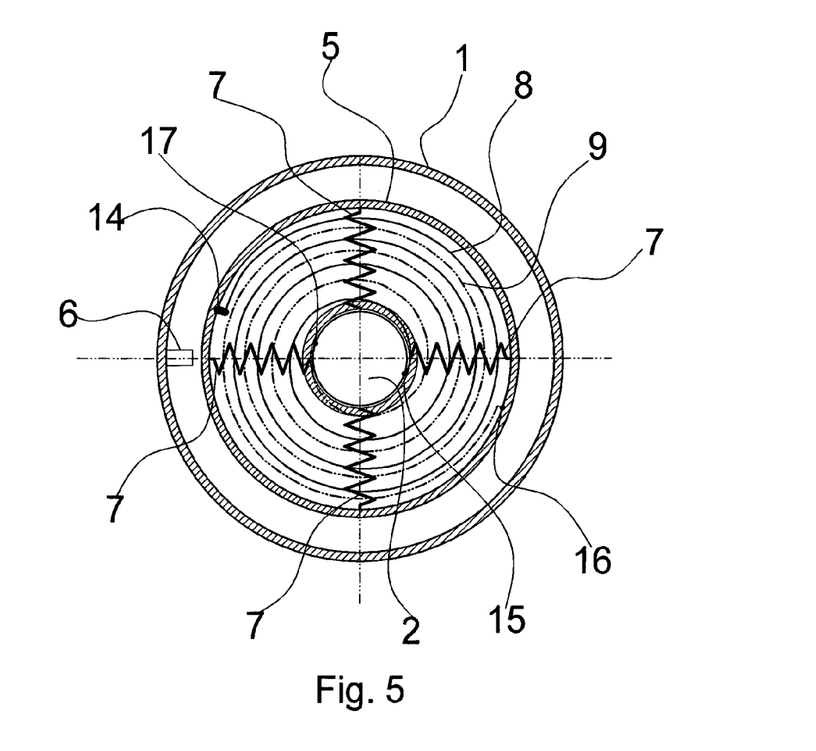
FIG. 5 shows a cross-section along the line B-B of FIG. 4.

FIGS. 4 and 5 show a second exemplary embodiment of the invention, wherein the arrangement of the buffer springs 8 and 9 and bellows-like springs 7 are configured differently. With one end, the bellows-like springs 7 are connected to the shaft 2 in a rotationally fixed manner, and with their other end are connected to the second code disk 5. The two buffer springs 8 and 9 are respectively fastened to the second code disk 5 with one end, and to the housing 1 with their other end. In the exemplary embodiment of FIGS. 4 and 5, the housing 1 has a sleeve-like segment 20, which encompasses the shaft 2 at a narrow distance. Thus, the buffer springs 8 and 9 and the springs 7 are, to the greatest possible extent, substantially parallel to one another, and are thus situated in the area between the code disk 5 and the shaft 2. Otherwise, the remaining elements, such as the first code disk 3, first sensor 4, separating disk 18, and damping members 13, are arranged in the same way as in the exemplary embodiment of FIGS. 1 and 2. The two buffer springs 8 and 9 are also arranged rotated by 180° relative to one another.

Figure 6:
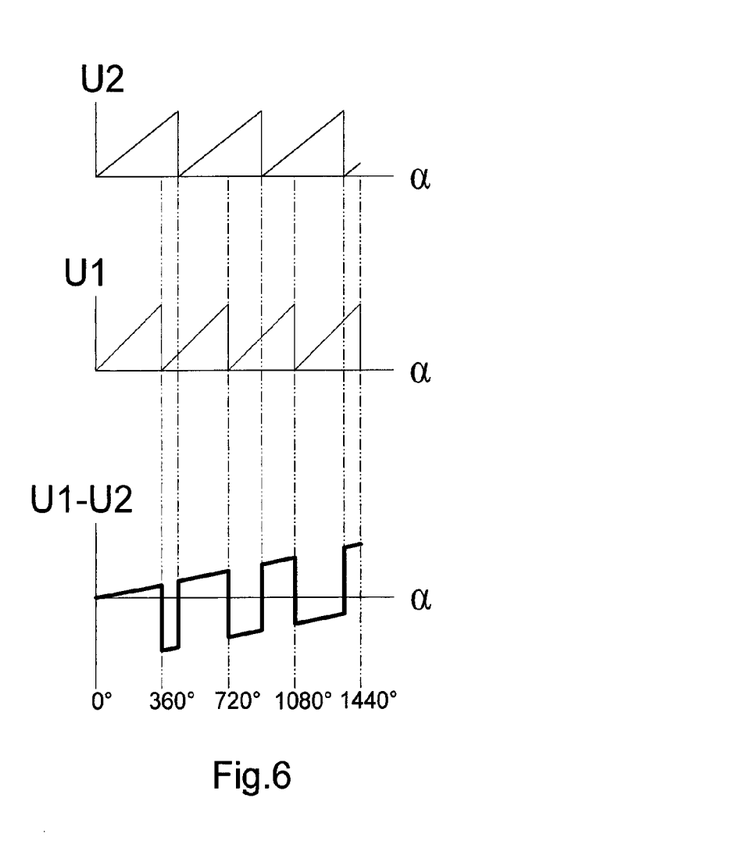
FIG. 6 shows a diagram of the output signals of the sensors of the exemplary embodiment of FIGS. 4 and 5.

With this arrangement, the second code disk 5 rotates with the shaft 2 to the greatest possible extend because the springs 7 only have a comparatively small extension and/or bending area. Thus, the second code disk 5 carries out several full rotations if the shaft 2 is also rotated several full rotations. However, during rotation of the shaft 2, the buffer springs 8 and 9 are tensioned, thus generating a force acting in a circumferential direction, which counteracts the drive force of the springs 7 so that the second code disk 5 lags behind the shaft 2 in the rotation thereof. The castor angle is thereby a function of the rotational angle $\alpha$ of the shaft 2, and with conventional buffer springs is linearly dependent on the rotational angle $\alpha$ of the shaft. Depending on the configuration of the springs 7, 8, and 9, the obtained output signal of the second sensor 6 is a curve as illustrated in FIG. 6 having a periodicity that differs from that of the output signal U1 of the first sensor 4. Determining the rotational angle $\alpha$ is done in a known manner, per se, as described in DE 100 48 911 C1 and DE 198 49 554 C1, for example, that is, by calculating the difference between output signals U1 and U2. If sensors 4 and 6 deliver sinusoidal or cosine-shaped output signals, the calculation of the angle $\alpha$ is also done in traditional fashion, as described in DE 195 39 134 C2, or DE 197 47 753 C1, DE 199 62 241 A1, DE 195 39 134 A1, DE 198 49 554 C1. Reference is made to the context of these documents in their entirety, and the disclosure content thereof is incorporated in the present application.

The difference U1 minus U2 is illustrated in FIG. 6. Negative values received when calculating the difference are corrected in the known manner in order to obtain a continuously linear angle signal for the angle $\alpha$.

Figure 7A:
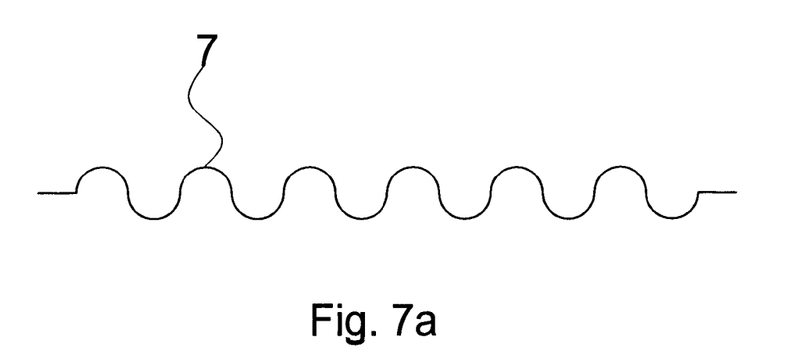
FIGS. 7a-7c show top views of springs of one of the spring groups used in the invention.
Figure 7B:
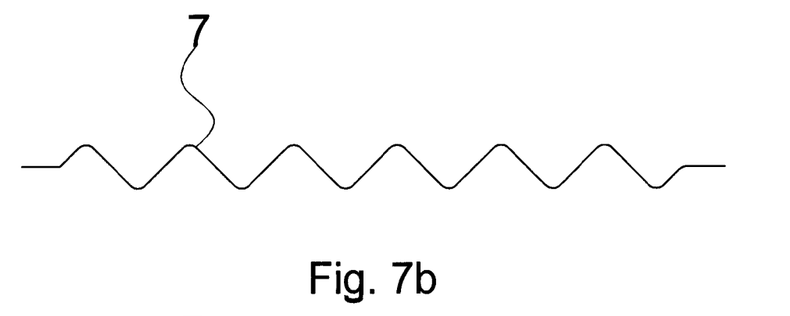
Figure 7C:
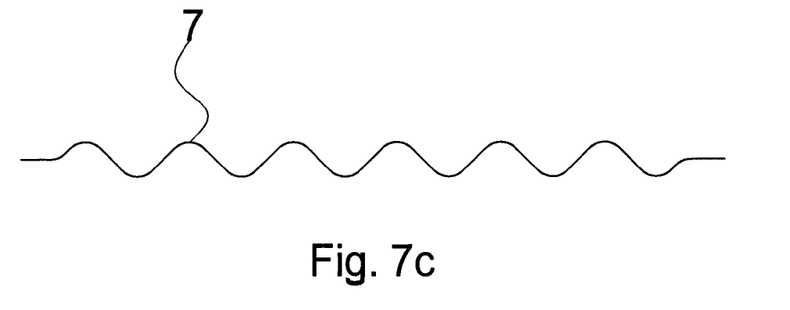

FIG. 7 shows in top view various variations for the spring 7. This spring is bent from flat spring band steel into a zig-zag shape. In FIG. 7a, the bends are semi-circular, whereas in FIGS. 7b and 7c, there is only a radius at the bending points, whereas in-between, there are straight-line sections also. What is important is that the spring 7 can both be bent with respect to its longitudinal axis, and also change its length with respect to the longitudinal axis. It is further beneficial if the spring 7 is as rigid as possible with respect to the axial direction of shaft 2 so that the axial position of the second code disk 5 is stable.

In principle, other springs can also be used, as for example, spiral springs, leaf springs, buffer springs, that is clock springs, wherein these springs have to be more rigid than the buffer springs of the other spring group, that is, they must have a steeper characteristic line. If these springs are resilient in the axial direction of the shaft, the damping members 13 provide a support for the second code disk 5.

It is also pointed out that generally speaking, the housing 1 shown in the embodiments can be a stationary body, for example, a body part of a vehicle, and does not necessarily have to be a component of the rotational angle sensor. It is, of course, preferred that it is a structural component of the rotational angle sensor that is rotationally fixed with respect to the shaft 2, and thus can also be a housing for the sensor.

In order to achieve a larger rotational angle for the second code disk 5 in the exemplary embodiment of FIGS. 1 and 2, the spring 7 can also be configured as one or several helical buffer springs. It only has to be made sure that in the full range of rotation of n*360° of the shaft 2, the second code disk 5 is rotated by less than 360°. Generally, this variation can also be applied to the exemplary embodiment of FIGS. 4 and 5. If these buffer springs are also resilient in the axial direction of the shaft 2, an axial support of the second code disk 5 must be provided.

Figure 8:
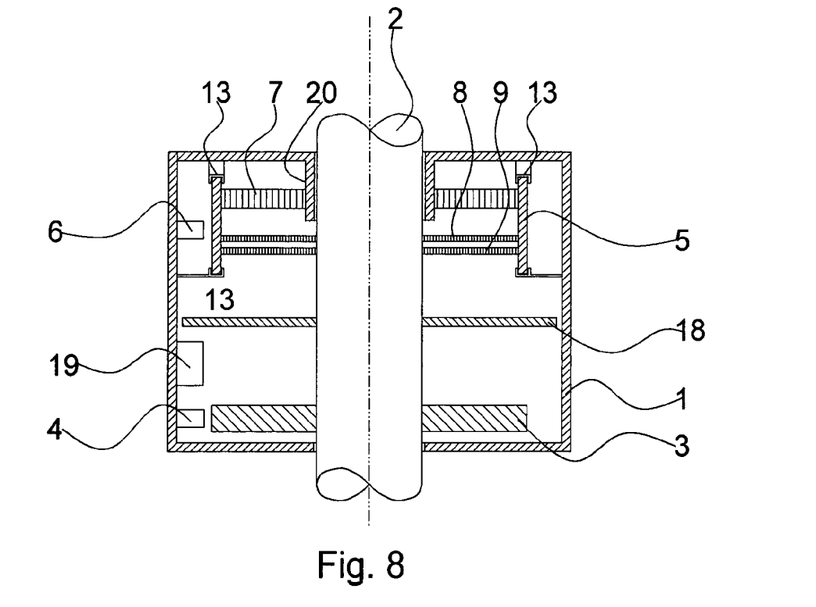
FIG. 8 shows a variation of the exemplary embodiment of FIG. 1 with spring groups located inside the second code disk.

The exemplary embodiment of FIG. 8 differs from that of FIG. 4 such that the two spring groups with the springs 7 on the one hand, and the springs 8, 9 on the other hand are interchanged, which is how the function of the exemplary embodiment in FIG. 1 is achieved, that is, the second code disk 5 is connected to the housing 1 by way of the springs 7, namely, to the sleeve-like segment 20 of the housing, which tightly surrounds the shaft 2. Thus, the second code disk 5 can only execute a very limited rotational movement, as in the exemplary embodiment 1.

In contrast to the exemplary embodiment in FIG. 1, the difference to the one in FIG. 8 is in the end such that the springs 7 are located inside the second code disk 5, and that the sleeve-like segment 20 of the housing 1 is provided.

It is also pointed out that in theory, it is possible with the exemplary embodiment in FIG. 4 to put the buffer springs 8 and 9 on the outside of the second code disk 5, and to fasten their other end to the housing 1.

Figure 9:
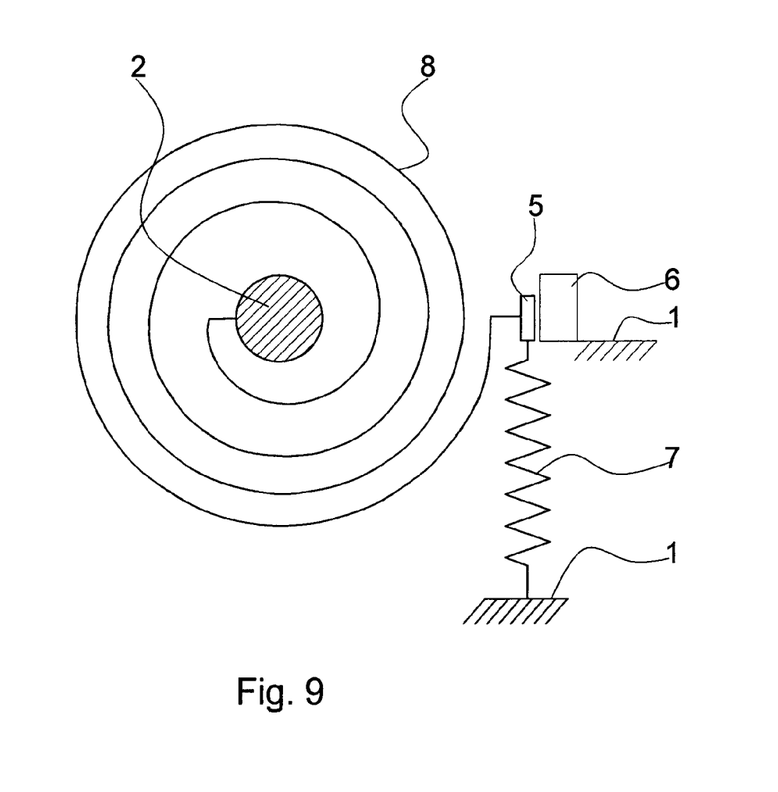
FIG. 9 shows a further exemplary embodiment of the invention.

FIG. 9 shows a schematic top view of a further exemplary embodiment of the invention, wherein instead of the second code disk 5 of the previous exemplary embodiments, only one object 5 is provided, which is held between a buffer spring 8 and an additional spring 7. One end of the buffer spring 8 is connected to the shaft 2. One end of the spring 7 is connected to a stationary object 1, which relative to the shaft 2 cannot be displaced, and in general, does not have to be a component of the rotational angle sensor, but can be, for example, a body part of a vehicle. It goes without saying that it can also be a housing of the rotational angle sensor. The object 5 can be a short magnet, to which the second sensor 6 is assigned, which, in turn, is likewise held in a fixed position. Thus, the sensor 6 detects the relative position of the object 5, which, depending on the configuration and design of the springs 7 and 8, does not have to move on a circular path around the shaft 2, as is the case in the previously described exemplary embodiments. However, the spatial position of the object 5 nevertheless depends on the mutual tensioning of the springs 7 and 8, and thus also from the rotational angle of the shaft 2, even if the object 5 itself does not move on a circular path. Nonetheless, it can be determined from the spatial position of the object 5, which of the possible n rotations the shaft is in.

The remaining necessary components of the rotational position sensor, namely, the first code disk 3 and the associated first sensor 4, are not shown in the illustration of FIG. 9, and are corresponding to the illustrations in FIGS. 1 to 8. However, it becomes especially clear from FIG. 9, that the second sensor 6 detects a position of the object 5, and not necessarily a rotational angle position.

The invention claimed is:

1. A rotational angle sensor for measuring the rotational position of a shaft, the sensor comprising: a first sensor and a second sensor, the first sensor and the second sensor located proximate the shaft, the first sensor configured to measure the rotational position of the shaft, and the second sensor configured to measure the position of an object, wherein the object is coupled to the shaft by way of at least one first spring, and wherein the object is further coupled to a body by way of at least one second spring, the object being rotationally fixed relative to the shaft.

2. The rotational angle sensor of claim 1, wherein a first spring group is provided with a plurality of first springs, and a second spring group is provided with a plurality of second springs.

3. The rotational angle sensor of claim 2, wherein at least one of the first or the second spring group is provided with a helical buffer spring, the helical buffer spring is dimensioned and configured such that it covers a full range of rotation of the shaft.

4. The rotational angle sensor of claim 3, wherein the object is connected to the shaft or the body by way of two identical buffer springs arranged parallel and proximate one another.

5. The rotational angle sensor of claim 3, wherein one of the spring groups are provided with several steel band springs bent in a zig-zag shape, and that at least three such springs are arranged around the shaft and spaced equidistantly to one another.

6. The rotational angle sensor of claim 3, wherein the buffer spring is fastened to the shaft and to the second code disk, and that the springs of the other spring group are fastened to the second code disk and to the housing.

7. The rotational angle sensor of claim 3, wherein the buffer spring is fastened to the housing and to the second code disk, and the springs of the other spring group are fastened to the shaft and to the second code disk.

8. The rotational angle sensor of claim 2, wherein the springs of both spring groups are arranged within the second code disk.

9. The rotational angle sensor of claim 1, wherein the first sensor scans a first code disk that is rotationally fixed to the shaft, and generates an output signal, which directly corresponds to the rotational angle of the shaft.

10. The rotational angle sensor of claim 1, wherein the object is a second code disk, and that the second sensor generates a second output signal, which corresponds to the rotational position of the object.

11. The rotational angle sensor of claim 10, wherein the second code disk is guided by damping members in the axial direction and the radial direction of the shaft.

12. The rotational angle sensor of claim 10, wherein both code disks are magnetized, and that the associated sensors are magnetic sensors.

13. The rotational angle sensor of claim 12, wherein a separating disk is arranged between the two code disks offset with respect to one another, the separating disk shielding the magnetic fields of the two code disks against one another.

14. The rotational angle sensor of claim 1, wherein the body is a structural component of the rotational angle sensor.

15. The rotational angle sensor according to claim 1, wherein the body is part of a component arranged adjacent to the rotational angle sensor.

16. The rotational angle sensor of claim 1, wherein the body is any part of the rotational angle sensor that is rotationally fixed.

17. The rotational angle sensor of claim 16, wherein the body is a housing of the rotational angle sensor.

18. A rotational angle sensor for measuring the rotational position of a shaft, the sensor comprising: a first sensor and a second sensor, the first sensor and the second sensor located proximate the shaft, the first sensor configured to measure the rotational position of the shaft, and the second sensor configured to measure the position of an object, wherein the object is coupled to the shaft by way of at least one first spring, and wherein the object is further coupled to a body by way of at least one second spring, the object being rotationally fixed relative to the shaft, wherein the first sensor scans a first code disk that is rotationally fixed to the shaft, and generates an output signal, which directly corresponds to the rotational angle of the shaft, and wherein the object is a second code disk, and that the second sensor generates a second output signal, which corresponds to the rotational position of the object.

* * * * *